Figure 1A:
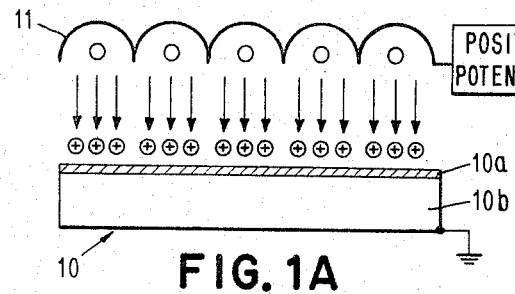

May 7, 1968 J. F. SCHOMBURG 3,382,361
METHOD OF AND APPARATUS FOR CHARGING A THERMOPLASTIC
RECORD MEDIUM TO PREVENT ARCING
Filed Dec. 13, 1965 2 Sheets-Sheet 1

*INVENTOR.*
JOHN F. SCHOMBURG
BY Robert E. Sandt
ATTORNEY

May 7, 1968     J. F. SCHOMBURG     3,382,361
METHOD OF AND APPARATUS FOR CHARGING A THERMOPLASTIC
RECORD MEDIUM TO PREVENT ARCING
Filed Dec. 13, 1965     2 Sheets-Sheet 2

United States Patent Office 3,382,361
Patented May 7, 1968

3,382,361
METHOD OF AND APPARATUS FOR CHARGING A THERMOPLASTIC RECORD MEDIUM TO PREVENT ARCING
John F. Schomburg, Stony Point, N.Y., assignor to International Business Machines Corporation, Armonk, N.Y., a corporation of New York
Filed Dec. 13, 1965, Ser. No. 513,191
7 Claims. (Cl. 250—49.5)

This invention relates to improvements in the method of and apparatus for charging a thermoplastic record member, and more particularly to improvements in charging a thermoplastic record member in air which eliminate arcing between the record member and the charging member.

While the basic idea of applying an electrostatic charge pattern to a thermoplastic record member to cause it to deform when heat softened under the applied field to produce an optical image is well-known, difficulties arise when it is sought to charge the record member in air. Necessarily the record member must be separated from the charging member with its pattern of charges undisturbed. When this is sought to be performed electrical arcing occurs between the surface of the thermoplastic and the surface of the charging member. This arcing impairs the quality of the electrical image and in some instances completely destroys portions of the image. The present invention is directed toward the elimination of the deleterious arcing as the record member is separated from the charging member, so as to provide a faithful electrostatic image on the thermoplastic record member.

It is therefore an object of this invention to provide an improved method for charging a thermoplastic record member to prevent arcing as the thermoplastic record member is separated from the charging member.

It is a further object of the invention to provide an improved apparatus for charging a thermoplastic record member to prevent arcing as the thermoplastic record member is separated from the charging member.

A specific object of this invention is to provide an improved method for charging a thermoplastic record member to prevent arcing as the record member is separated from the charging member by charging the charging member with a charge pattern of a first electrical polarity, overlaying the charging member with the first surface of the thermoplastic record member in contact therewith, applying a charge to the second surface of said record member of a second electrical polarity, overlaying the record member with an insulated metal keeper in contact with the second surface of the record member, the metal keeper being unconnected to any potential source, separating the record member and its insulated metal keeper from the charging member, charging the first of said surfaces of said record member from a source of potential of said first polarity, and separating said record member from said keeper while said keeper is unconnected to a potential source.

A further specific object of this invention is to provide an improved apparatus for charging a thermoplastic record member to prevent arcing as the record is separated from the charging member wherein there is provided means for applying a charge pattern of a first electrical polarity to a charging member manifestive of the desired image to be stored in the thermoplastic record member, means for bringing a first surface of the thermoplastic record member in contiguous relationship with the surface of the charging member, means for applying an electrical charge of a second electrical polarity to the second surface of the thermoplastic record member while it is in contiguous position with respect to said charging member, an insulated metal keeper unconnected to any source of potential, means for bringing the second surface of the record member in contiguous relationship to said keeper and for thereafter separating said record member from said charging member while said record member is in contiguous relationship to said keeper, means for charging the first surface of said record member from a source of potential of said first polarity, and means for separating said record member from said keeper.

The foregoing and other objects, features and advantages of the invention will be apparent from the following more particular description of preferred embodiments of the invention, as illustrated in the accompanying drawings.

Figure 1B:
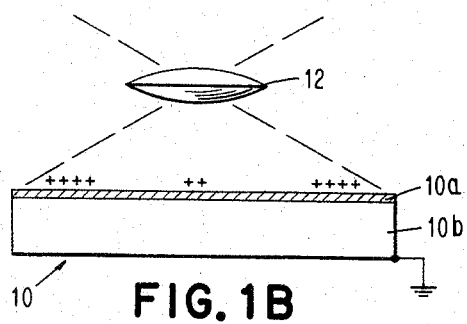
Figure 7:
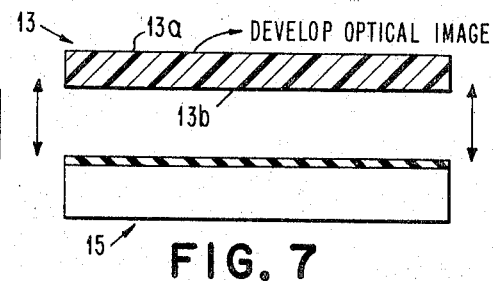

In the drawings:

FIG. 1 (including 1A and 1B) through FIG. 7 shows the successive steps of the improved method for charging a thermoplastic record member.

Figure 8:
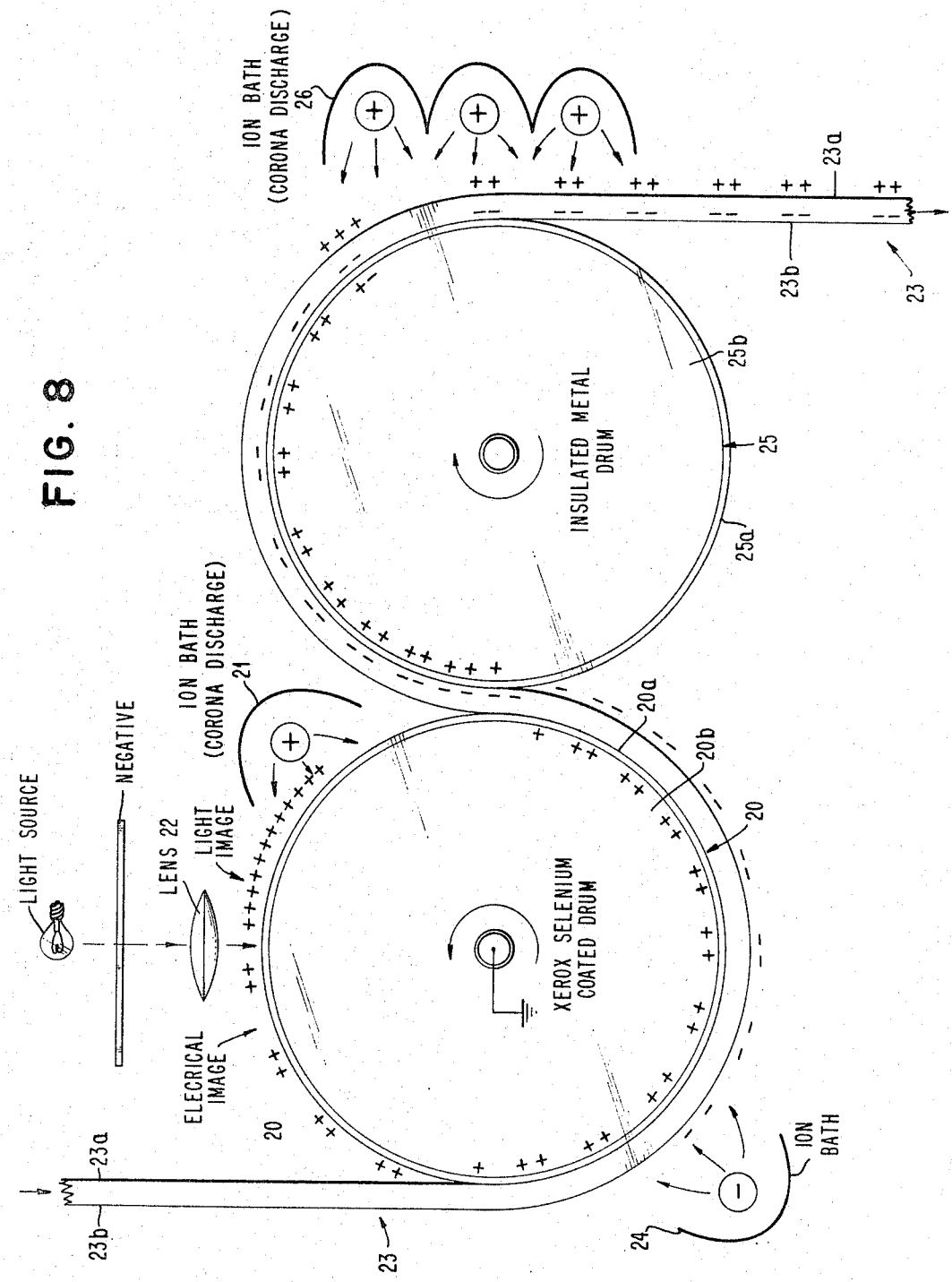

FIG. 8 shows an apparatus for performing the successive steps of the invention.

In FIG. 1 through 7 the successive steps for producing an electrostatic charge pattern on a thermoplastic record medium are illustrated schematically. Since the apparatus for performing the requisite steps are well reported in the patent literature only the steps themselves will be described. In FIG. 1A the charging member 10 consisting of the photoconductive insulating layer 10a backed by a grounded conductive metal substrate 10b is uniformly charged from a positive ion source 11. The charging member 10 is then exposed, by means of optics 12 (and other conventional equipment not shown), to the desired light image which selectively reduces the uniform charge pattern on the charging member 10 to produce the charge pattern in response to the intensity gradient of the optical image, as shown in FIG. 1B. This is a standard practice in the art of xerography.

Figure 2:
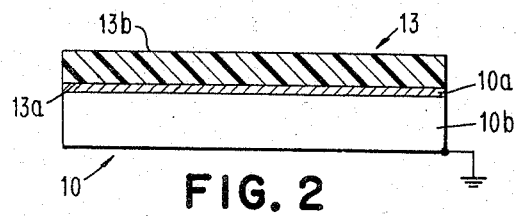

The thermoplastic record member 13 is then laid over the charging member 10 with the surface 13a thereof in contiguous relationship to the surface of the photoconductive layer 10a on which the charge pattern has been developed by the procedure above-described. This step is shown in FIG. 2.

Figure 3:
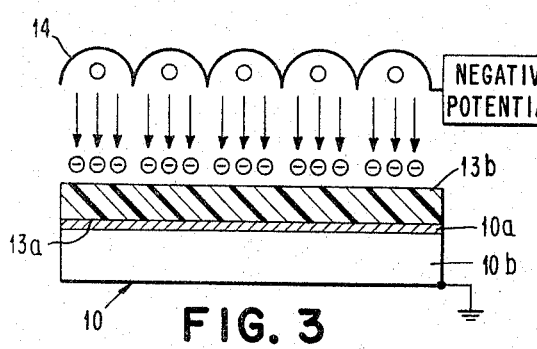

In the third step of the process, shown in FIG. 3, the surface 13b is irradiated from a source of negative ions 14 to develop in the thermoplastic record member a charge pattern corresponding to that on the charging member 10. If the thermoplastic member 13 were to be stripped from the charging member 10 at this step in the process arcing will be produced which dissipates the charge on the thermoplastic tending to emasculate the image, and in fact in severe cases completely destroying portions of the image. The subsequent steps to be described prevent this arcing. Thus, the integrity of the image is preserved.

Figure 4:
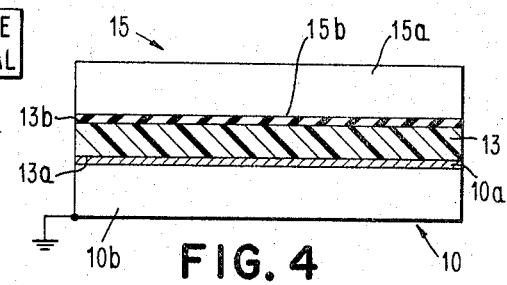

In the fourth step, shown in FIG. 4, an insulated metal keeper 15 is laid over the thermoplastic record member 13 while it is still in contiguity with the charging member 10. This keeper consisting of the conductive metal substrate 15a and insulating coating 15b is unconnected to any potential source and is placed upon the record member with the insulating coating 15b in contact with the surface 13b of the record member.

Figure 5:
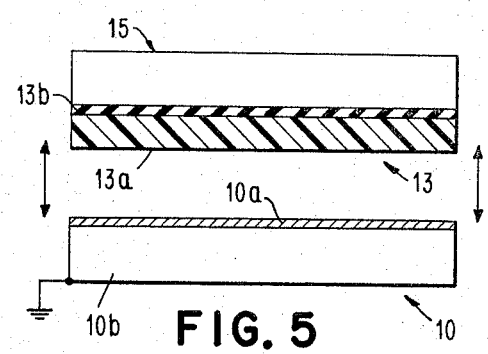

The fifth step, shown in FIG. 5, consists of removing the record member 13 together with the metal keeper 15

(still unconnected to any potential source) from contact with the charging member 10. Because of the presence of the metal keeper, together with its dielectric coating, no arcing occurs between the surface 13a of the record member and the surface of the photoconductive layer 10a. The integrity of the electrostatic image on the thermoplastic record member is preserved. The record member to be useable, however, must be separated from its keeper. The sixth and seventh steps effect this separation.

Figure 6:
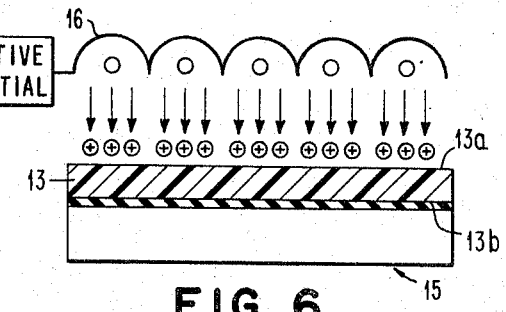

Step six, shown in FIG. 6, consists of irradiating the surface 13a of the record member from a source 16 of positive ions, while it is still in contact with the metal keeper. The seventh and final step (FIG. 7) merely separates the record member 13 from the metal keeper 15. Because, of the final ionic irradiation, this separation is also achieved without arcing, and the record member 13 is now available for heat softening to develop an optical image corresponding to the charge pattern, first created on the charging member 10 and faithfully reproduced in the thermoplastic record member 13.

An apparatus for automatically effecting the sequence of operations set forth above, and in FIGS. 1 through 7 is illustrated schematically in FIG. 8. To assist in correlating the sequence of steps in the process with the operation of the apparatus of FIG. 8, components having a similar function in FIG. 8 will have a reference numeral which is ten greater than the corresponding component in FIGS. 1–7. Thus, the charging member 10 of FIG. 1 will correspond to the charging drum 20 of FIG. 8. The record member 13 of FIGS. 1–7 becomes 23 in FIG. 8.

The charging member 20 consisting of a grounded metal drum 20b coated with a photoconductive layer 20a, such as selenium, rotates counterclockwise as shown in FIG. 8. This drum is first charged with a uniform positive charge by corona discharge from a source 21 of positive ions. It then rotates past an exposure station where optics 22 image a light pattern on the drum to selectively discharge the uniform charge pattern in accordance with the intensity pattern of the optical image. The drum 20, with its charge pattern, upon further rotation contacts the surface 23a of the record member 23, which in this instance is a continuous web or belt of thermoplastic material, wrapped around the lower half of drum 20. As the record member 23 moves synchronously with the drum 20 it passes a source of negative ions 24 wherein the surface is irradiated as in step 3 (FIG. 3) above. Continued movement of the line of centers of the charging drum 20 and keeper drum 25 brings the record member 23 in contact with both drums, corresponding to step 4, supra. At this point the record member 23 leaves the charging drum 20 and wraps around the keeper drum 25 to rotate with it. The keeper drum consists of an insulated coating 25a covering a metal drum 25b, which is electrically isolated and rotates with the same surface speed as drum 20, thus obviating any relative movement and consequent slippage.

When the keeper drum 25, together with record member 23 has rotated a sufficient distance to provide isolation for a further corona discharge device, the surface 23a is irradiated from a source of positive ions 26. Continued rotation, following this irradiation, separates the record member 23 from the keeper drum 25 as the member leaves the drum on the line of centers. The record member 23 is now fed by rollers (not shown) to further processing stations for development of the optical image.

From the foregoing description, it will be readily appreciated that the apparatus of FIG. 8 effectively performs the requisite steps of the process in a continuous line. That the apparatus operates on successive incremental portions of the charging drum and the record member, and that the keeper effects a line contact does not alter the basic principle of the invention. The continuous processing of the record member in an apparatus such as FIG. 8 is more susceptible to automation than is the intermittent type of operation exemplified in FIGS. 1–7. This former operation is better used in a limited production hand-operated type of copying apparatus.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of charging a thermoplastic record member with a charge pattern manifestive of a visible image desired to be stored in the member comprising the steps of:
   (a) applying a charge pattern of a first electrical polarity to a charging member manifestive of the pattern of optical densities desired to be recorded in the thermoplastic record member;
   (b) overlaying the charging member with the thermoplastic record medium with a first surface thereof in contiguous relationship to the charging member;
   (c) irradiating the second surface of said record member with ions of a second polarity, while said record member remains in contiguous relationship with said charging member;
   (d) overlaying the second surface of said record member with an insulated metal keeper unconnected to any potential source;
   (e) separating the record member and the keeper from the charging member;
   (f) irradiating the first surface of the record member, thus exposed, from a source of ions of said first polarity;
   (g) and separating said record member from said keeper.

2. Apparatus for charging a thermoplastic record medium with a charge pattern manifestive of a visible image desired to be stored in the member, comprising:
   (a) a charging member;
   (b) means for applying an electrical charge pattern of a first polarity to said charging member, manifestive of the image desired to be stored in the thermoplastic storage medium;
   (c) a thermoplastic record member;
   (d) means for moving the said record member into contiguous relationship with said charging member with a second surface thereof exposed;
   (e) means for irradiating said second surface of said record member with an ionic discharge of a second polarity;
   (f) a conductive keeper member having an insulated coating thereon;
   (g) means for moving said keeper member relative to said record member to bring said keeper into contiguous relationship with said second surface of said record member;
   (h) means for moving said record member relative to said charging member to separate the two members to expose the first surface of said record member;
   (i) means for irradiating the said first surface of said record member with an ionic discharge of the first polarity;
   (j) and means for moving said record member relative to said keeper to separate the record member from the keeper.

3. The apparatus of claim 2 wherein said charging member and said keeper member are drums arranged for counter rotation at equal surface speeds and said record member is an elongated web of thermoplastic material partially wrapped around both drums, the drums being so spaced that the record member is in contact with both drums along the line of centers of the drums.

4. The apparatus of claim 3 wherein the wrap of the record member around the charging drum is so arranged as to leave a portion of the drum surface exposed.

5. The apparatus of claim 4 wherein the means for applying a charge pattern to said charging drum is disposed adjacent to the region wherein the drum surface is exposed.

6. The apparatus of claim 5 wherein the means for irradiating said second surface of said record member is disposed adjacent to said charging drum within the region wherein the record member is wrapped around the charging drum.

7. The apparatus of claim 6 wherein the means for irradiating said first surface of said record member is disposed adjacent to said keeper drum within the angle of wrap of said record member around said drum.

References Cited
UNITED STATES PATENTS

| | | | |
|---|---|---|---|
| 3,162,104 | 12/1964 | Medley | 95—1.7 |
| 3,258,336 | 6/1966 | Ewing | 96—1.1 |

RALPH G. NILSON, *Primary Examiner.*

A. L. BIRCH, *Assistant Examiner.*